US010755288B2

(12) United States Patent
Liang et al.

(10) Patent No.: US 10,755,288 B2
(45) Date of Patent: Aug. 25, 2020

(54) DETERMINING ADVERTISING CONVERSION (71) Applicant: Google LLC, Mountain View, CA (US)

(72) Inventors: Sam Liang, Palo Alto, CA (US); Marius C. Milner, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/377,503

(22) Filed: Apr. 8, 2019

(65) Prior Publication Data
US 2019/0236616 A1 Aug. 1, 2019

Related U.S. Application Data (63) Continuation of application No. 12/594,094, filed as application No. PCT/US2008/058906 on Mar. 31, 2008, now Pat. No. 10,304,065, which is a continuation of application No. 11/694,635, filed on Mar. 30, 2007, now abandoned.

(51) Int. Cl.
G06Q 30/02 (2012.01)
(52) U.S. Cl.
CPC ......... G06Q 30/02 (2013.01); G06Q 30/0259 (2013.01)
(58) Field of Classification Search
CPC .......................... G06Q 30/02; G06Q 30/0259
See application file for complete search history.

(56) References Cited

U.S. PATENT DOCUMENTS

| 6,332,127 | B1 | 12/2001 | Bandera et al. |
| 6,970,922 | B1 | 11/2005 | Spector |
| 6,993,570 | B1 | 1/2006 | Irani |
| 7,596,610 | B2 | 9/2009 | Faisal et al. |
| 7,653,594 | B2 | 1/2010 | Davis |
| 7,668,832 | B2 | 2/2010 | Yeh et al. |
| 8,065,675 | B2 | 11/2011 | Strauss et al. |
| 2002/0116266 | A1 | 8/2002 | Marshall |

(Continued)

FOREIGN PATENT DOCUMENTS

| EP | 1098289 | 5/2001 |
| JP | 2001-134650 | 5/2001 |

(Continued)

OTHER PUBLICATIONS

C. Steinfield, T. Adelaar and Ying-ju Lai, "Integrating brick and mortar locations with e-commerce: understanding synergy opportunities," 35th Annual Hawaii International Conference on System Sciences, available at: https://ieeexplore.ieee.org/stamp/stamp.jsp?tp=&arnumber=994254 (Year: 2002).*

(Continued)

Primary Examiner — Katherine Kolosowski-Gager
(74) Attorney, Agent, or Firm — Fish & Richardson P.C.

(57) ABSTRACT

The present disclosure relates to a system and method for determining advertising conversion metrics. In some implementations, a method includes receiving spatial information associated with a user in connection with an advertisement presented through a wireless device 102. The advertisement is associated with an offline 110 store having a geographic location. A likelihood of conversion is determined based, at least in part, on the spatial information and the geographic location of the offline store 110.

23 Claims, 4 Drawing Sheets

(56) References Cited

U.S. PATENT DOCUMENTS

| | | |
|---|---|---|
| 2002/0161633 A1 | 10/2002 | Jacob et al. |
| 2003/0187871 A1 | 10/2003 | Amano et al. |
| 2003/0212595 A1 | 11/2003 | Antonucci |
| 2004/0093268 A1* | 5/2004 | Ramchandani .... G06Q 30/0242 705/14.13 |
| 2005/0050097 A1 | 3/2005 | Yeh et al. |
| 2006/0242009 A1 | 10/2006 | Crolley |
| 2007/0005419 A1 | 1/2007 | Horvitz et al. |
| 2007/0038516 A1 | 2/2007 | Apple et al. |
| 2007/0185768 A1 | 8/2007 | Vengroff et al. |
| 2007/0277248 A1 | 11/2007 | Agrawal et al. |
| 2008/0010143 A1 | 1/2008 | Kniaz et al. |
| 2008/0109317 A1 | 5/2008 | Singh |
| 2008/0133342 A1 | 6/2008 | Criou et al. |
| 2008/0248815 A1 | 10/2008 | Busch |
| 2009/0037254 A1 | 2/2009 | Colando |
| 2010/0057532 A1* | 3/2010 | Sanguinetti ............ G06Q 30/02 705/7.29 |
| 2010/0063877 A1 | 3/2010 | Soroca et al. |
| 2011/0015993 A1 | 1/2011 | Ramer et al. |
| 2011/0016465 A1 | 1/2011 | Siegel et al. |
| 2011/0078011 A1 | 3/2011 | Senghore et al. |
| 2011/0159884 A1 | 6/2011 | Chawla |
| 2011/0161172 A1 | 6/2011 | Lee |
| 2013/0006770 A1* | 1/2013 | Vengroff ............ G06Q 30/0259 705/14.54 |
| 2013/0210418 A1 | 8/2013 | Cannon et al. |

FOREIGN PATENT DOCUMENTS

| | | |
|---|---|---|
| JP | 2003-308459 | 10/2003 |
| JP | 2003-346039 | 12/2003 |
| JP | 2005-148289 | 6/2005 |
| JP | 2005-182194 | 7/2005 |
| WO | WO 00/70504 | 11/2000 |
| WO | WO 2008121962 | 10/2008 |

OTHER PUBLICATIONS

'AD-X' [online] "Advertisers & Agencies," [retrieved on Mar. 7, 2013]. Retrieved from the internet: URL<http://web.archive.org/web/20120222115208/http://adxtracking.com/agencies.php>, 1 page.

'AD-X' [online] "FAQs," [retrieved on Mar. 7, 2013]. Retrieved from the internet: URL<http://web.archive.org/web/20120308024617/http://adxtracking.com/faq.php> 2 pages.

'AD-X' [online] "Mobile Analytics," [retrieved on Mar. 7, 2013]. Retrieved from the internet: URL<http://web.archive.org/web/20120222114915/http://adxtracking.com/mobile-analytics.php>, 1 page.

'AD-X' [online] "Why do I need AD-X?," [retrieved on Mar. 7, 2013]. Retrieved from the internet: URL<http://web.archive.org/web/20120316193458/http://adxtracking.com/why.php>, 1 page.

Office Action issued in Australian Application No. 2011245475 dated Aug. 12, 2014, 5 pages.

Gurvinder Singh, U.S. Appl. No. 60/863,093, filed Oct. 26, 2006.

International Preliminary Report on Patentability dated Nov. 15, 2012 from related International application No. PCT/US2011/033966, 8 pages.

International Search Report and the Written Opinion for International Application No. PCT/US2011/033966, dated Mar. 23, 2012, 11 pages.

Japanese Office Action in Japanese Application No. 2010-501281, dated Dec. 11, 2012, 8 pages (including English Translation).

Korean Intellectual Property Office, International Preliminary Report on PCT/US2008/058906, dated Oct. 15, 2009, 7 pages.

Office Action issued in Indian Application No. 2035/MUMNP/2009 dated Mar. 15, 2016, 2 pages.

\* cited by examiner

FIG. 4

DETERMINING ADVERTISING CONVERSION

REFERENCE TO RELATED APPLICATIONS

This application is a continuation application of, and claims priority to, U.S. patent application Ser. No. 12/594,094, filed on Feb. 19, 2010, which application is a National Stage application under 35 U.S.C. § 371 and claims benefit of International Application No. PCT/US2008/058906 having an International Filing Date of Mar. 31, 2008, which claims the benefit of priority of Ser. No. 11/694,635 having a filing date of Mar. 30, 2007. The discloser of the foregoing applications are incorporated herein by reference in their entirety for all purposes.

TECHNICAL FIELD

This invention relates to advertising.

BACKGROUND

Content delivery over the internet continues to improve every day. Computer users can receive e-mail, news, games, entertainment, music, books, and web pages—all with a simple Internet connection (and with improved quality on a broadband connection). Internet users also have access to a plethora of services such as maps, shopping links, images, blogs, local search, satellite images, group discussions, hosted content, and e-mail. These service providers may determine users' interactions with such services to determine associated metrics and/or modify these services based on such interactions to further enhance the user experience.

SUMMARY

The present disclosure relates to a system and method for determining advertising conversion metrics. In some implementations, a method includes receiving spatial information associated with a user in connection with an advertisement presented through a wireless device. The advertisement is associated with an offline store having a geographic location. A likelihood of conversion is determined based, at least in part, on the spatial information, temporal information and/or the geographic location of the offline store.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
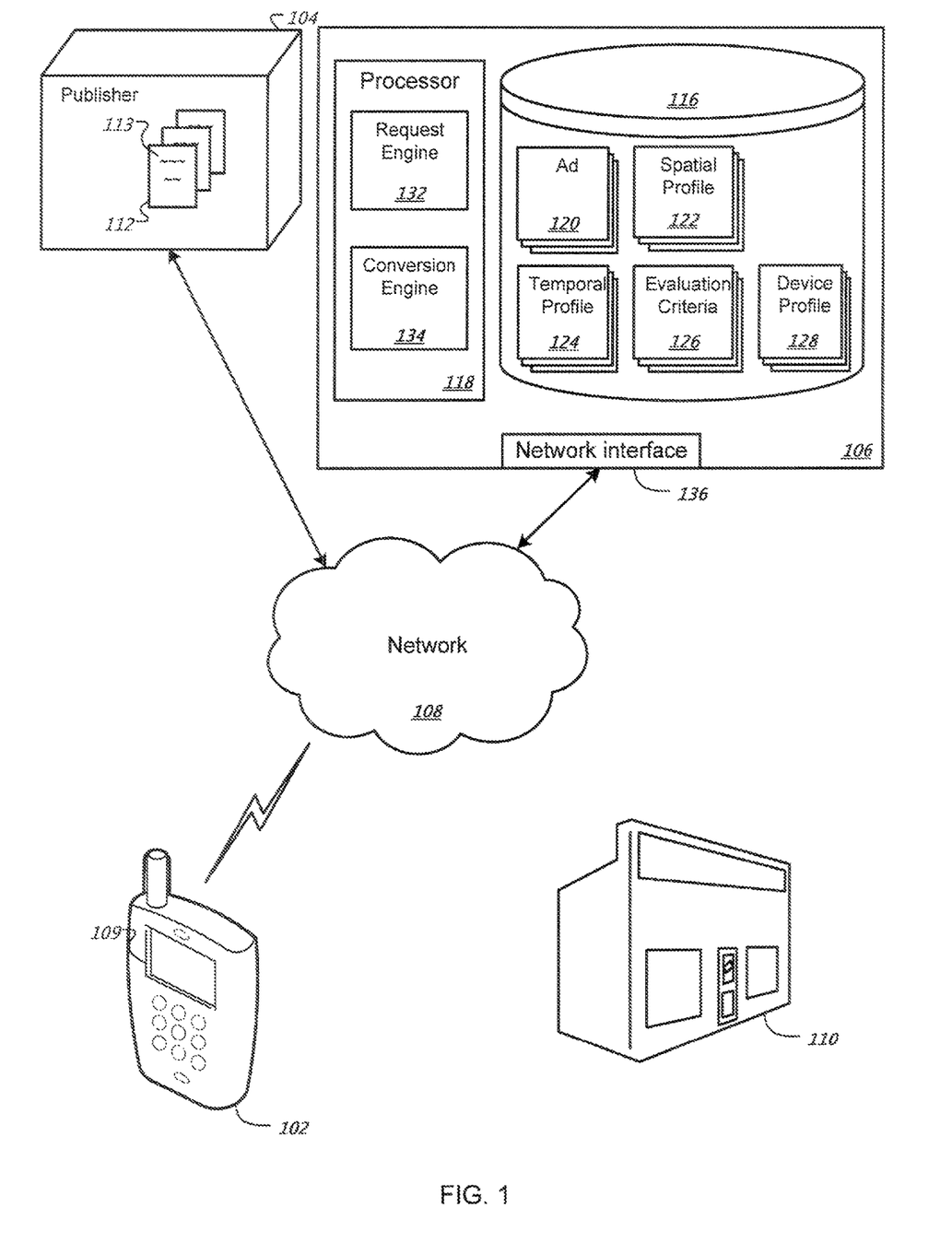
FIG. 1 is a block diagram illustrating an advertising system in accordance with some implementations of the present disclosure.

FIG. 1 illustrates an exemplary advertising system 100 for serving advertisements, e.g., for offline stores, transmitted to wireless devices. An offline store is often referred to as a brick-and-mortar store because at least a portion of the store's services and/or products are provided through a physical store. For example, an offline store can include a restaurant, a gas station, a beauty salon, a fitness center, and other stores. In some implementations, the system 100 performs two functions: transmitting advertisements for an offline store in response to the wireless device being spatially proximate; and determining a likelihood of a conversion at the offline store based, at least in part, on spatial (and in some cases temporal, information associated with the wireless device. In some implementations, the user can opt into (or out-of) a system that determines the likelihood of a conversion at the offline store based on spatial (and perhaps) temporal information associated with the wireless device. In addition or alternatively, in some implementations, the information associated with the wireless device may be made anonymous, i.e., the information associated with the wireless device does not contain any personally identifiable information.

In one example, for a user that has opted into such a system, the system 100 may determine that the wireless device is within a distance (e.g., quarter of a mile) of an offline store, transmit an advertisement for the offline store for display through a wireless device, and determine that the user likely purchases goods and/or services based on the duration of time spent in proximity to the offline store. In regards to spatial proximity, the system 100 may identify spatial information and/or temporal information associated with a wireless device and determine that the wireless device satisfies a spatial threshold associated with an offline store. Spatial information can include information associated with the location of the wireless device such as coordinates (e.g., longitude, latitude), a distance from an offline store, an indication that the wireless device is within a particular range of the offline store, an error associated with a determined location, and/or others. Temporal information can include information associated with the time and/or period of time that the wireless device is within a certain distance of a store such as a timestamp of entering a range, a timestamp exiting a range, a period of time associated with the wireless device being within a range, an error of temporal determination, and/or others. In regards to determining a likelihood of conversion, the system 100 may use temporal information and/or spatial information to determine a period of time that the wireless device is within a specified distance of the offline store. Such temporal and/or spatial information may be used differently for different types of business (e.g., gas station, beauty salon). In connection with determining likelihood of a conversions, the system 100, in some implementations, may determine expected conversion rates for particular ads presented through wireless devices.

In the implementation shown, system 100 includes a client device 102, a publisher 104, and an ad server 106 coupled via network 108. The system 100 also includes an offline store 110. The client device 102 is any device (e.g., computing device) operable to connect to or communicate with publisher 104 and/or ad server 106 over network 108 using any communication link. The client device 102 includes, executes, or otherwise presents a Graphical User Interface (GUI) 109 and comprises an electronic device operable to receive, transmit, process and store any appropriate data associated with system 100. While the illustrated implementation includes the single client device 102, system 100 may include any number of client devices 102 communicably coupled to network 108. Moreover, for ease of illustration, the client 102 is described in terms of being used by one user though this disclosure contemplates that many users may use one device or that one user may use multiple devices.

As used in this disclosure, a user of client device 102 is any person, department, organization, small business, enterprise, or any other entity that may use or request others to use system 100. Client device 102 is intended to encompass a personal computer, touch screen terminal, workstation, network computer, a desktop, kiosk, wireless data port, smart phone, personal data assistant (PDA), one or more processors within these or other devices, or any other suitable processing or electronic device used for viewing content from ad server 106. For example, client device 102 may be a PDA operable to wirelessly connect with an external or unsecured network. In another example, client device 102 may comprise a laptop that includes an input device, such as a keypad, touch screen, mouse, or other device that can accept information, and an output device that conveys information associated with an advertisement of ad server 106, including digital data, visual information, or GUI 109. Both the input device and output device may include fixed or removable storage media such as a magnetic computer disk, CD-ROM, or other suitable media to both receive input from and provide output to users of clients device 102 through the display such as GUI 109.

The GUI 109 comprises a graphical user interface operable to allow the user of the client device 102 to interface with at least a portion of the system 100 for any suitable purpose, such as viewing advertisements 120. Generally, the GUI 109 provides the particular user with an efficient and user-friendly presentation of data provided by or communicated within the system 100. The GUI 109 may comprise a plurality of customizable frames or views having interactive fields, pull-down lists, and/or buttons operated by the user. The term graphical user interface may be used in the singular or in the plural to describe one or more graphical user interfaces and each of the displays of a particular graphical user interface. The GUI 109 can include any graphical user interface, such as a generic web browser or touch screen, that processes information in the system 100 and presents the results to the user. The publisher 104 can accept data from the client device 102 using, for example, the web browser (e.g., Microsoft Internet Explorer or Mozilla Firefox) and return the appropriate responses (e.g., HTML or XML) to the browser using the network 108.

Publisher 104 comprises an electronic device (e.g., computing device) operable to receive, transmit, process and store data associated with system 100. In the illustrated embodiment, publisher 104 provides display pages 112 to client devices 102 for display through GUI 109. Display pages 112 comprise displays through which an advertisement can be presented to users of client devices 102. In general, display pages 112 include any machine readable and machine storable work product that may generate or be used to generate a display through GUI 109. Display pages 112 may be a file, a combination of files, one or more files with embedded links to other files, etc. Display pages 112 may include text, audio, image, video, animation, and other attributes. In short, display pages 112 comprise any source code or object code for generating a display and providing instructions for retrieving an advertisement 120 to embed in the display and referred to as an ad slot 113. For example, ad slot 113 may identify a banner advertisement for presenting information associated with a product and/or service. Such instructions may be written in or based on any suitable programming language such as JavaScript.

Ad server 106 comprises an electronic computing device operable to receive, transmit, process and store data associated with system 100. System 100 can be implemented using computers other than servers, as well as a server pool. Indeed, ad server 106 may be any computer, electronic or processing device such as, for example, a blade server, general-purpose personal computer (PC), Macintosh, workstation, Unix-based computer, or any other suitable device. In other words, system 100 may include computers other than general purpose computers as well as computers without conventional operating systems. Ad server 106 may be adapted to execute any operating system including Linux, UNIX, Windows Server, or any other suitable operating system. In certain implementations, ad server 106 may also include or be communicably coupled with a web server and/or a mail server.

Ad server 106 includes memory 116 and a processor 118. Memory 116 may be a local memory and include any memory or database module and may take the form of volatile or non-volatile memory including, without limitation, magnetic media, optical media, random access memory (RAM), read-only memory (ROM), removable media, or any other suitable local or remote memory component. In the illustrated implementation, memory 116 includes network ads 120, spatial profiles 122, temporal profiles 124, evaluation criteria 126, and device profiles 128, but may include other information without departing from the scope of this disclosure. Local memory 116 may also include any other appropriate data such as applications or services, firewall policies, a security or access log, print or other reporting files, HTML files or templates, data classes or object interfaces, child software applications or sub-systems, and others.

Network ads 120 include any parameters, pointers, variables, algorithms, instructions, rules, files, links, or other data for easily providing secondary content through GUI 109. Such network ads 120 may include (among other things) primary content, secondary content, and/or sponsored content. For example, each network ad 120 may be a text element, a graphics element, a multimedia element, a network link to a second application, a network link to a remote module, an executable, or any other graphical or display element. In a more specific example, network ad 120 may be identified or otherwise be associated with one or more offline stores 110 within a particular physical location. In certain implementations, network ads 120 (or pointers thereto) may be stored in one or more tables in a relational database described in terms of SQL statements or scripts. In certain implementations, network ads 120 may be formatted, stored, or defined as various data structures in text files, eXtensible Markup Language (XML) documents, Virtual Storage Access Method (VSAM) files, flat files, Btrieve files, comma-separated-value (CSV) files, internal variables, or one or more libraries. For example, a particular network ad 120 may merely be a pointer to a third party ad stored remotely. In another example, a particular network ad 120 may be an internally stored advertisement for a tightly coupled service. In short, network ads 120 may comprise one table or file or a plurality of tables or files stored on one computer or across a plurality of computers in any appropriate format. Indeed, some or all of network ads 120 may be local or remote without departing from the scope of this disclosure and store any type of appropriate data.

Spatial profiles 122 include parameters, variables, policies, algorithms, instructions, settings, or rules for identifying spatial information associated with offline stores 110. For example, spatial profile 122 may identify a geographical area associated with an offline store 110. In some implementations, the spatial profile 122 identifies a location and a region around the physical location. Of course, the above parameters are for example purposes and may not reflect some implementations within the scope of this disclosure. The spatial profile 122 may include one or more of the following parameters: a location, one or more areas, an error associated with the location and/or area, and other information associated with the physical location of one or more offline stores 110. Each spatial profile 122 may be associated with one or multiple offline stores 110. Multiple spatial profiles 122 may be associated with a single offline store 110. In some implementations, multiple levels of geographical region may be defined for a single offline store 110. For example, a spatial profile 122 containing an innermost geographical region may define the parameters of the building or the retail space occupied by offline store 110. A spatial profile 122 containing a larger geographical region may be defined to include the primary parking area for guests of offline store 110. An even wider geographical region may be provided in a third spatial profile 122 which encompasses more remote parking options. In this way, a probability of a conversion may be associated with the different geographic regions. In some implementations, the larger areas may have a lower associated probability as compared with the inner most areas. Spatial profiles 122 may be stored in one or more tables stored in a relational database described in terms of SQL statements or scripts. In other implementations, spatial profiles 122 may be formatted, stored, or defined as various data structures in text files, HTML documents, XML documents, VSAM files, flat files, Btrieve files, CSV files, internal variables, or one or more libraries. In short, spatial profiles 122 may comprise one table or file or a plurality of tables or files stored on one computer or across a plurality of computers in any appropriate format. Moreover, spatial profiles 122 may be local or remote without departing from the scope of this disclosure and store any type of appropriate data.

Temporal profiles 124 include parameters, variables, policies, algorithms, instructions, settings, or rules for identifying temporal information associated with offline stores 110. For example, the temporal profile 124 may identify hours of operation and/or average lengths of client visits for the offline store 110. In some implementations, the temporal profile 124 may identify the times of the day for each day of the week that offline store 110 operates. In some implementations, temporal profile 124 may define one or more lengths of time for accomplishing one or more conversions at the offline store 110. For example, the temporal profile 124 may associate a car purchase with four hours and a car rental with 30 minutes. In another example, the temporal profile 124 may associate a house application with two hours and a car loan application with 45 minutes. Some of the temporal profiles 124 may be associated with different types of offline stores 110. For example, a first temporal profile 124 may be associated with gas stations and indicate that a purchase averages five minutes while a second temporal profile 124 may be associated with restaurants and indicates that 45 minutes is associated with a transaction. The temporal profile 124 may include one or more of the following: a specific store, a type of store, hours of operation, period of times, types of conversion, and others. Of course, the above parameters are for example purposes and may not reflect some implementations within the scope of this disclosure. Each temporal profile 124 may be associated with one or multiple offline stores 110. In some implementations, multiple temporal profiles 124 may be a single offline store 110 based on the type of conversion. For example, a temporal profile 124 containing a shorter visit timeframe may with a purchase of hair care products, while a temporal profile 124 containing a longer visit timeframe associated with a haircut. In another example, offline store 110 may be associated with one temporal profile 124 listing standard business hours and one or more temporal profiles 124 containing holiday business hours, such as Christmas week or the day after Thanksgiving. Temporal profiles 124 may be stored in one or more tables stored in a relational database described in terms of SQL statements or scripts. In other implementations, temporal profiles 124 may be formatted, stored, or defined as various data structures in text files, HTML documents, XML documents, VSAM files, flat files, Btrieve files, CSV files, internal variables, or one or more libraries. In short, temporal profiles 124 may comprise one table or file or a plurality of tables or files stored on one computer or across a plurality of computers in any appropriate format. Moreover, temporal profiles 124 may be local or remote without departing from the scope of this disclosure and store any type of appropriate data.

Device profiles 128 include parameters, variables, policies, algorithms, instructions, settings, or rules for determining the spatial and/or temporal activities of client devices 102, e.g., of client devices that have opted into a conversion determination system. For example, each device profile 128 may identify locations and associated timestamps without using personally identifiable information. Alternatively or in addition, the instructions may include limits on the precision of the spatial (and perhaps temporal) identification. In some implementations, the device profile 128 may include one or more of the following: locations, regions, timestamps, dates, device type, and others. In some implementations, ad server 106 is capable of determining anonymous information about client devices 102 such by querying the network 108. In another implementation, a third party (not pictured within FIG. 1), such as a cellular provider, can provide anonymous spatial and/or temporal information for client device 102. In another implementation, the information may not be anonymous when a user opts into a conversion determination system. In some implementations device profiles 128 may also include geographical regions associated with the device (e.g., home address of user, work address of user). Of course, the above parameters are for example purposes and may not reflect some implementations within the scope of this disclosure. In some implementations, each device profile 128 may be associated with a single or multiple clients 102. In some implementations, multiple device profiles 128 may be associated with a single client 102. In some implementations, the device file 128 is associated with a single user and may be referred to as a user profile. In the case of a user profile, the device profile 128 may include spatial and/or temporal information for each user device.

Device profiles 128 may be stored in one or more tables stored in a relational database described in terms of SQL statements or scripts. In other implementations, device profiles 128 may be formatted, stored, or defined as various data structures in text files, HTML documents, XML documents, VSAM files, flat files, Btrieve files, CSV files, internal variables, or one or more libraries. In short, device profiles 128 may comprise one table or file or a plurality of tables or files stored on one computer or across a plurality of computers in any appropriate format. Moreover, device profiles 128 may be local or remote without departing from the scope of this disclosure and store any type of appropriate data.

Evaluation criteria 126 include any parameters, variables, algorithms, instructions, rules, objects or other directives for evaluating the likelihood of client device 102 having visited offline store 110 in response to ad 120. In some implementations, the evaluation criteria 126 identify an expression for determining a probability that a conversion of ad 120 has occurred. Alternatively or in combination, evaluation criteria 126 may identify or may be used to identify ranges of regional and/or temporal criteria associated with a visit of client device 102 to offline store 110 and the likelihood of the visit having culminated in a transaction due to ad 120 associated with each range. This can be referred to as the likelihood of conversion. For example, evaluation criteria may identify three ranges and associate one or more of the following likelihoods: likely, possibly, or not likely. In some implementations, evaluation criteria 126 may be based, at least in part, on information obtained from one or more spatial profiles 122 and/or one or more temporal profiles 124 associated with offline store 110. In addition to including criteria for evaluating ad conversions, evaluation criteria 126 may include mathematical expressions for performing calculations using spatial profile(s) 122 and/or temporal profile(s) 124. For instance, evaluation criteria 126 may include mathematical expressions for computing probabilities a transaction having been completed at offline store 110 in response to at least receiving the ad 120. For example, the evaluation criteria 126 may include specific ranges such that each range is associated with a specific likelihood. Such ranges may be provided by publisher 104 or a user of ad server 106, dynamically determined by ad server 106, or provided by any other suitable device or user associated with system 100. For example, three spatial profiles 122 may exist for offline store 110. Using the three spatial profiles and a minimum span of time for visiting the region associated with the spatial profiles, the evaluation criteria may contain algorithms which weigh the likelihood of ad conversion having taken place. Evaluation criteria 126 may be based on any suitable attribute associated with ad 120 and/or publisher 104. For example, evaluation criteria 126 may include criteria for evaluating ad conversions during specified holidays (e.g., Easter season, Christmas) versus standard days of operation. Evaluation criteria 126 may be stored in one or more tables stored in a relational database described in terms of SQL statements or scripts. In other implementations, evaluation criteria 126 may be formatted, stored, or defined as various data structures in text files, HTML documents, XML documents, VSAM files, flat files, Btrieve files, CSV files, internal variables, or one or more libraries. In short, device evaluation criteria 126 may comprise one table or file or a plurality of tables or files stored on one computer or across a plurality of computers in any appropriate format. Moreover, evaluation criteria 126 may be local or remote without departing from the scope of this disclosure and store any type of appropriate data.

Processor 118 executes instructions and manipulates data to perform operations of ad server 106. Although FIG. 1 illustrates a single processor 118 in ad server 106, multiple processors 118 may be used according to particular needs, and reference to processor 118 is meant to include multiple processors 118 where applicable. In the illustrated implementation, processor 118 executes request engine 132 and conversion engine 134 at any appropriate time such as, for example, in response to a request or input from publisher 104 or any appropriate computer system coupled with network 108. Request engine 132 includes any software, hardware, and/or firmware, or combination thereof, operable to retrieve and forward ads 120 based on information forwarded by publisher 104 and any other applicable criteria. In the case of selecting an ad 120, request engine 132 may receive client information such as spatial location provided through network 108 or device profile 128, match this location to one or more spatial profiles 122, narrow the result based upon other criteria (e.g., business hours contained in temporal profile 124), and return an associated ad 120 to publisher 104. For instance, if client device 102 is within a close proximity to two different offline stores 110 based upon spatial profiles 122, but it is Sunday and one of the offline stores 110 is closed on Sunday according to temporal profile 124, the request engine can forward the ad 120 associated with the offline store 110 which is open on Sunday. In some implementations, request engine 132 may evaluate the spatial profiles 122 and/or temporal profiles 124 and the device profile 128 using any suitable mathematical and/or logical expression.

Conversion engine 134 includes any software, hardware, and/or firmware, or combination thereof, operable to evaluate the likelihood of ad conversion based on any suitable process using evaluation criteria 126 and temporal and/or spatial data collected within device profile 128 or otherwise polled from network 108. In some implementations, in the case of evaluating an ad conversion, conversion engine 134 may receive anonymous temporal and/or spatial data from device profile 128 regarding client device 102, evaluate the ad conversion potential using evaluation criteria 126, and determine a likelihood of ad conversion based upon the client device having displayed ad 120. In alternative implementations, if an owner of the client device has opted into a conversion detection system that associates personally identifiable information with his/her client device so that the user can receive enhanced services, the conversion detection system may receive additional information. In some implementations, prior to evaluating ad conversions, conversion engine 134 may perform one or more calculations using device profile 128, evaluation criteria 126, and/or spatial profile(s) 122 and temporal profile(s) 124. For example, conversion engine 134 may compare the time at which the client device 102 visited the region associated with the offline store 110 to the hours of operation provided within the temporal profile 124. Regardless of calculations, conversion engine 134 may identify criteria for determining ad conversion using evaluation criteria 126. Criteria may include a number, a range, a threshold, and/or any other suitable criteria for evaluating the potential conversion of the ad 120.

Calculating the likelihood of conversion of ad 120 may include evaluating the data collected within device profile 128 based on the spatial profile(s) 122 and/or the temporal profile(s) 124 associated with the offline store 110 and/or the evaluation criteria 126 associated with the ad 120. Because multiple clients 102 can be associated with a single user, in some implementations, multiple device profiles 128 may be taken into consideration when comparing geographical regions visited to spatial profile(s) 122 associated with offline store 110. In some implementations, conversion engine 134 may calculate the likelihood of ad conversion using any suitable mathematical and/or logical expression. For example, conversion engine 134 may determine or otherwise identify ranges associated with the likelihood of ad conversion. For example, conversion engine 134 may divide the ad conversion likelihood into three ranges. In this case, the three ranges may be associated with a low, medium, or high probability of the viewing of the ad 120 having resulted in a transaction at the offline store 110. In the range example, conversion engine 134 may determine a likelihood of conversion by comparing the spatial data collected within device profile 128 to different ranges associated with the offline store 110 (e.g., store itself, immediate parking lot, remote parking area). In some implementations, the conversion engine 134 may determine a likelihood of conversion by comparing the temporal data associated with client device 102 to expanding ranges of time spent within the relative geographic location of the offline store 110. In one example, a visit of forty-five minutes to a restaurant may have a higher likelihood of conversion compared with a twenty minute visit. In some implementations, the conversion engine 134 may also consider the time lag between the client device 102 receiving the ad 120 and the client device 102 arriving within the geographic location of the offline store 110 associated with the ad 120 when determining the probability of ad conversion.

Regardless of the particular implementation, "software," as used herein, may include software, firmware, wired or programmed hardware, or any combination thereof as appropriate. Indeed, request engine 132 and conversion engine 134 may be written or described in any appropriate computer language including C, C++, C#, Java, J#, Visual Basic, assembler, Perl, any suitable version of 4GL, as well as others. It will be understood that while request engine 132 and conversion engine 134 are illustrated in FIG. 1 as including individual modules, each of request engine 132 and conversion engine 134 may include numerous other sub-modules or may instead be a single multi-tasked module that implements the various features and functionality through various objects, methods, or other processes. Further, while illustrated as internal to server 106, one or more processes associated with request engine 132 and/or conversion engine 134 may be stored, referenced, or executed remotely. Moreover, request engine 132 and/or conversion engine 134 may be a child or sub-module of another software module or enterprise application (not illustrated) without departing from the scope of this disclosure.

Ad server 106 also includes interface 136 for communicating with other computer systems, such as publisher 104 and client device 102, over network 108 in a client-server or other distributed environment. In certain implementations, ad server 106 receives data from internal or external senders through interface 136 for storage in local memory 116 and/or processing by processor 118. Generally, interface 136 comprises logic encoded in software and/or hardware in a suitable combination and operable to communicate with network 108. More specifically, interface 136 may comprise software supporting one or more communications protocols associated with communications network 108 or hardware operable to communicate physical signals.

Network 108 facilitates wireless or wired communication between ad server 106 and any other local or remote computer, such as publisher 104 and client device 102. Network 108 may be all or a portion of an enterprise or secured network. While illustrated as single network, network 108 may be a continuous network logically divided into various sub-nets or virtual networks without departing from the scope of this disclosure, so long as at least a portion of network 108 may facilitate communications of ads 120 and client data between ad server 106, publisher 104, and client device 102. In some implementations, network 108 encompasses any internal or external network, networks, sub-network, or combination thereof operable to facilitate communications between various computing components in system 100. Network 108 may communicate, for example, Internet Protocol (IP) packets, Frame Relay frames, Asynchronous Transfer Mode (ATM) cells, voice, video, data, and other suitable information between network addresses. Network 108 may include one or more local area networks (LANs), radio access networks (RANs), metropolitan area networks (MANs), wide area networks (WANs), all or a portion of the global computer network known as the Internet, and/or any other communication system or systems at one or more locations.

Publisher 104 receives a request for a display page 112 from client device 102. In some implementations, publisher 104 transmits an ad request, including anonymous identifying information regarding client device 102, to ad server 106. Based on the request and information obtained from spatial profile(s) 122, temporal profile(s) 124, and/or device profile 128, request engine 132 identifies ad 120. Ad server 106 transmits the ad 120 to publisher 104. Publisher 104 transmits the request display page 112 including the ad 120 to client device 102. Ad server 106 determines the location of client device 102. For example, in some implementations, the ad server 106 may receive, periodically poll, or otherwise identify anonymous location information using the network 108. In some implementations, the ad server 106 updates an associated device profile 128 with the location information. This period of time may vary depending upon the nature of the ad 120 and/or the services provided by the offline store 110. If, during the set period of time, the client device 102 enters the region of offline store 110, ad server 106 calculates the total amount of time spent within said region. After the anonymous client device 102 has been recognized as having visited the region, or after the set period of time has expired, conversion engine 134 uses this temporal and/or spatial data along with the evaluation criteria 126 to determine the likelihood of conversion.

Figure 2:
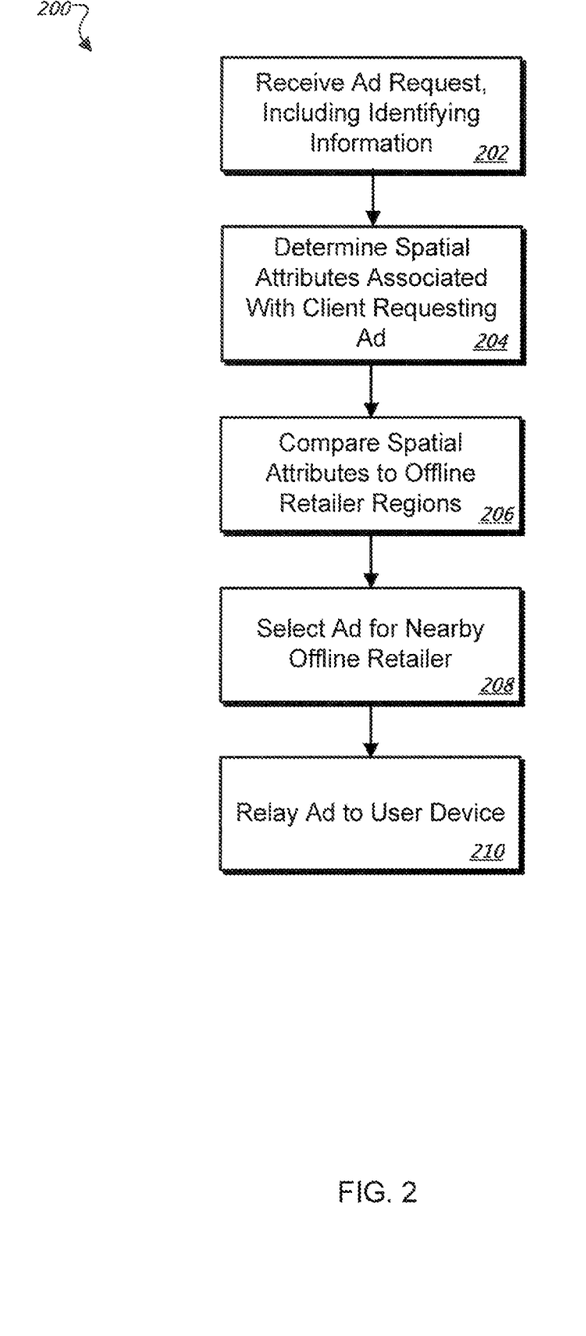
FIG. 2 is a flow diagram illustrating an example method for handling the request for an advertisement in the advertising system of FIG. 1.

FIG. 2 is a flow diagram illustrating an example method 200 for handling the request for an advertisement in accordance with some implementations of the present disclosure. Generally, method 200 describes an example technique for receiving a request for an ad associated with an offline store, determining the closest or otherwise most convenient retailer to present in response to the request, and transmitting ad information back to the requester. Method 200 contemplates using any appropriate combination and arrangement of logical elements implementing some or all of the described functionality.

Method 200 begins at step 202 where a request for an offline ad is received. In some implementations, the ad request includes information anonymously identifying the device which will be receiving the ad. For example, ad server 106 may receive a request from publisher 104 for an ad 120 associated with, for example, an offline store 110 proximate the client device 102. In some implementations, such as those where the user has opted in for enhanced services, the request, in this circumstance, may contain information identifying the client device 102, such as a cellular telephone number, network service provider customer identifier, and/or other information.

At step 204, one or more spatial attributes are determined. For example, ad server 106 may query the present location of client device 102 using the network 108. Alternatively, ad server 106 could find a geographic location within the device profile 128 associated with client device 102. In some implementations, such as where the user has opted in to receive enhanced services, the device profile 128 may contain information regarding the billing address, work address, home address, and/or other commonly visited area associated with client 102.

Using these spatial attributes, at step 206, an ad for a nearby offline store can be identified. Request engine 132, for example, can compare the geographic location(s) associated with client device 102 to spatial profiles 122 to find the most convenient offline store 110 to client device 102. In some implementations, other information may be used to narrow the results to the retailers the user of the client device 102 is most likely to visit. For instance, temporal profiles can contain hours of operations for offline stores 110. Request engine 132 could use the business hours to select an offline store 110 which is presently open.

At step 208, once a spatial profile has been selected, the associated ad 120 can be located. In some implementations, conversion engine 134 looks up the ad 120 based upon the spatial profile 122 selected at step 206. The ad may then be relayed to the requester at step 210. For example, the request engine 132 can then forward the ad information 120 to the publisher 104 in response to the ad request. The publisher 104, in this circumstance, would forward the ad 120 to the client device 102.

Figure 3:
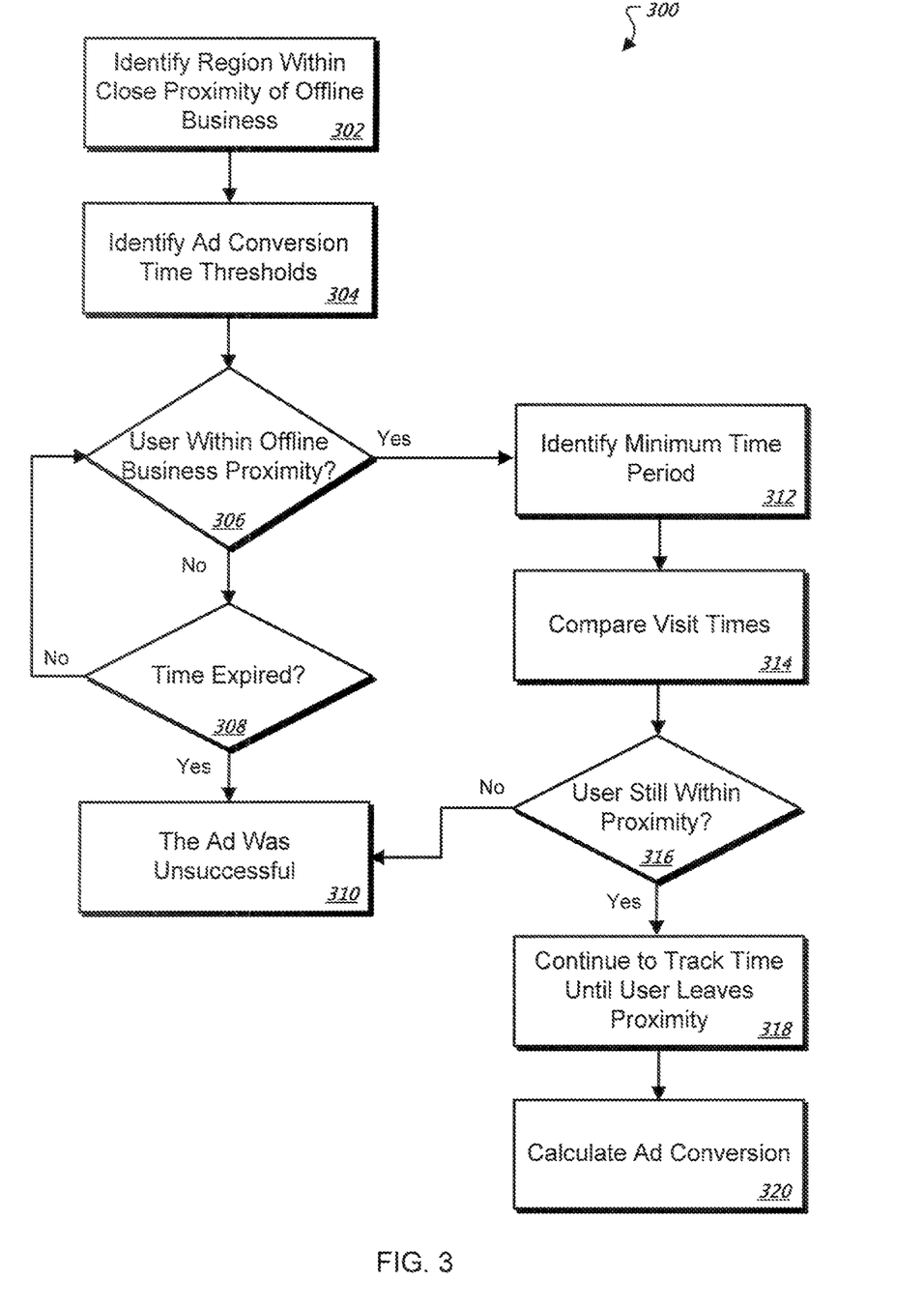
FIG. 3 is a flow diagram illustrating an example method for determining the likelihood of a conversion associated with the retailer in the advertising system of FIG. 1.

FIG. 3 is a flow diagram illustrating an example method 300 for determining the likelihood of an ad having generated business for the presented retailer in accordance with some implementations of the present disclosure. Generally, method 300 describes an example technique for communicating with a device through a wireless network and determining proximity of the device to an offline store associated with an ad previously presented to the user. There are two main elements to method 300. First, in step 306, the method 300 determines whether or not the wireless device has ever entered the region corresponding to the offline store. If so, at step 314, the method 300 determines a period of time within that region to determine a likelihood that the user responded to the ad. Method 300 contemplates using any appropriate combination and arrangement of logical elements implementing some or all of the described functionality.

Method 300 begins at step 302 by identifying a region associated with an offline business. For example, ad 120 was previously forwarded to client 102 in response to an ad request from publisher 104. Ad server 106 may associate an instance of the ad 120 with the client device 102, for example, within device profile 128. A region or set of regions associated with ad 120 (e.g. found within spatial profile(s) 122) may be associated with the location of the offline store 110.

At step 304, one or more ad-conversion time thresholds are identified. The thresholds indicate lengths of time indicative of a conversion at an offline store. For example, these may be derived from or otherwise identified in evaluation criteria 126 and/or temporal profile 124 associated with ad 120. In some implementations, the threshold corresponds to a period of time indicative that a user has visited a specific region associated with an offline store in response to having viewed a particular ad.

In connection with identifying the ad-conversion threshold, the method 300 anonymously determines the geographic location of the client device. For example, the ad server 106 may query the network 108 at set intervals to determine the present location of client device 102 and/or process the device profile 128. If in step 306, the method 300 does not determine that the user has entered the vicinity of the offline business, and if the ad conversion threshold is not satisfied at step 308, then the method determines that the instance of the ad has a low likelihood of a conversion.

If, however, the method 300 finds at step 306 that the user has entered a region associated with the offline store, then the method 300 identifies, at step 312, a threshold for a specific conversion within the identified region. As mentioned above, the threshold may vary depending upon the type of conversion at the particular offline store. For example, temporal profile(s) 124 and/or evaluation criteria 126 may contain a rule regarding the amount of time within the region of offline store 110 to complete a transaction. This period of time may be based upon the offline store 110 (e.g., it generally takes five minutes or more to complete a transaction at a gas station), the ad 120 (e.g., it generally takes five minutes or more to complete a transaction for a gift certificate at a restaurant, while it may take twenty minutes or longer to purchase and/or consume an entree), and other parameters. The method compares period of times associated with the user to the thresholds at step 314.

If the period times do not satisfy the thresholds at step 316, e.g., the client device exits the regions, then the method 300 determines the ad to be unsuccessful and/or have a low likelihood of conversion at step 310. In one example, the ad server 106 may query the network 108 upon time expiration to obtain an update on the present location of client device 102. In some implementations, the ad server receives periodic updates from network 108. In this case, the conversion engine 134 may dynamically determine likelihoods of conversion and/or identify temporal information in the device profile 128.

If period of time within the region of the offline store satisfies the threshold, the method 300 can continue to determine the length of visit, at step 318, until the user exits the one or more regions associated with the offline store. In this case, the ad server 106 may determine likelihoods for different types of conversions. For example, a user who visits a region associated with a coffee shop for a half hour may have a have a high likelihood of purchasing food products while a six minute visit may have a high likelihood of only purchasing a beverage. In some implementations, the ad server 106 may store periodic geographical data associated with client device 102 in device profile 128.

Once the method 300 has determined that the user paid a visit to the region of the offline store and left, the method 300 can calculate the ad conversion in step 320. For example, conversion engine 134 can calculate the likelihood of ad conversions. Information contained within the evaluation criteria 126, spatial profile(s) 122, temporal profile(s) 124, and/or device profile 128 may be used to determine these calculations. In some implementations, conversion engine 134 assigns the results to discrete ranges (e.g., low, medium, or high likelihood). In other implementations, conversion engine 134 determines a probability of an ad conversion. Method 300 may perform any other calculations for assigning a likelihood such as a Boolean yes/no result.

Figure 4:
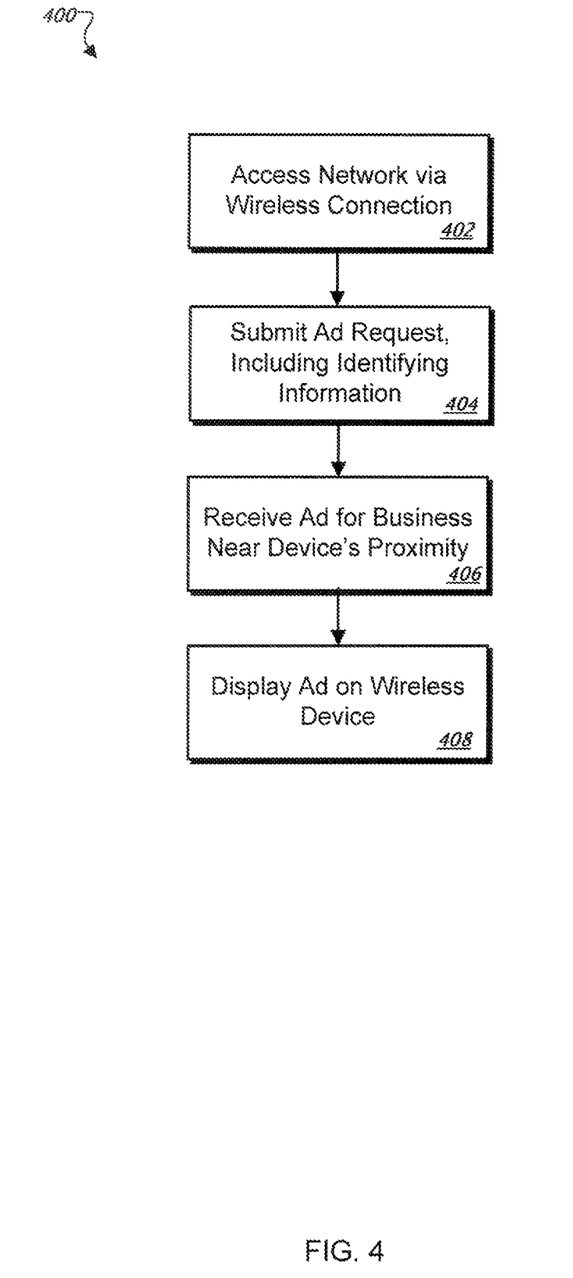
FIG. 4 is a flow diagram illustrating an example method for a wireless device to request an ad in the advertising system of FIG. 1.

FIG. 4 is a flow diagram illustrating an example method 400 for requesting an ad through a wireless network. Generally, method 400 describes an example technique a wireless device can use to request and receive digital advertisement content through a network. Method 400 contemplates using any appropriate combination and arrangement of logical elements implementing some or all of the described functionality.

Method 400 begins at step 402 by accessing a communications network through a wireless connection. For example, client device can access network 108 using any suitable form of wireless communication. At step 404, an ad content request is transmitted to a content provider. The ad request can include anonymous information identifying the requesting client device. In one example, client device 102 transmits a request to publisher 104 via network 108. In some implementations, the request includes an anonymous device identifier (e.g., an IP address, a cookie that includes no user personal information, or in jurisdictions where an IP address is considered not-anonymous, an alpha numeric string) . . . . In another example, where the owner of the client device has opted into a conversion detection system that determines personally identifiable information so that the system can provide the user with enhanced services, the client device request may include additional information.

The wireless device receives an ad for an offline store proximate the device's location at step 406. In some implementations, the ad is forwarded through the publisher 104 from the ad server 106 to the client device 102 via network 108. In some implementations, client device 102 is queried by the network 108 prior to ad selection to determine a present location of client device 102. This allows ad server 106 to locate an ad for an offline store which is near the present location of the user. In other implementations, stored location data, for example within device profile 128, can be used as spatial input for ad selection. At step 408, the ad is displayed within the GUI of the wireless device.

Although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A method, comprising:
   remotely obtaining, by a computer system, a present location of a wireless device;
   determining, based on the present location and store location data, one or more physical retail locations of a business that are closest to the present location of the wireless device;
   providing, to the wireless device, information identifying the one or more physical retail locations of the business that are closest to the present location of the wireless device;
   after providing the information to the wireless device, iteratively remotely obtaining location data specifying locations of the wireless device over a time period following the information being provided to the wireless device;
   determining, based on the location data, that the wireless device traveled to a particular physical retail location among the one or more physical retail locations during a first time period; and
   determining, based on a second amount of time that the wireless device was located at the particular physical retail location, whether delivery of the information to the wireless device resulted in a specific user action, including:
      determining that the delivery of the information to the wireless device resulted in the specific user action when the second amount of time that the wireless device was located at the particular physical retail location is greater than a specified threshold amount of time required to complete the specific user action after arriving at the particular physical retail location; and
      determining that the delivery of the information to the wireless device failed to result in the specific user action when the second amount of time that the wireless device was located at the particular physical retail location is less than the specified threshold amount of time required to complete the specific user action after arriving at the particular physical retail location.

2. The method of claim 1, wherein providing information identifying the one or more physical retail locations of the business that are closest to the present location of the wireless device further comprises:
   providing information related to one or more user action opportunities at the one or more physical retail locations of the business.

3. The method of claim 2, wherein the specified threshold amount of time is a minimum amount of time to complete the one or more user action opportunities at the one or more physical retail locations of the business.

4. The method of claim 3, further comprising:
   determining that the delivery of the information to the wireless device resulted in the specific user action based on a comparison of temporal information for the particular physical retail location and the minimum amount of time to complete the specific user action associated with the particular physical retail location.

5. The method of claim 1, wherein determining one or more physical retail locations of a business that are closest to the present location of the wireless device further comprises:
   determining, based on temporal profiles including hours of operation for the one or more physical retail locations of the business that are closest to the present location of the wireless device, the one or more physical retail locations that have temporal profiles that are presently open for business.

6. The method of claim 1, wherein the specified threshold amount of time is within a range of time for a user to complete the specific user action at the particular physical retail location.

7. The method of claim 1, further comprising:
   determining, based on the determination that the delivery of the information to the wireless device resulted in the specific user action, to provide additional information identifying a second set of one or more physical retail locations of the business that are closest to the present location of the wireless device.

8. The method of claim 1, wherein determining, based on the location data, that the wireless device traveled to the particular physical retail location among the one or more physical retail locations during the time period comprises:
   determining, based on the location data, that the wireless device is located within a threshold distance of the particular physical retail locations for at least a threshold amount of time.

9. The method of claim 1, further comprising:
   recording, for a plurality of wireless devices, data describing whether the provided information identifying the one or more physical retail locations of the business that are closest to present locations of the plurality of wireless resulted in the specific user action at the particular physical retail location; and
   determining, based on the recorded data, associated conversion metrics for the provided information.

10. The method of claim 9, wherein the associated conversion metrics for the provided information are associated with a particular geographic region of the one or more physical retail locations of the business.

11. A system comprising:
one or more computers and more or more storage devices storing instructions that are operable, when executed by the one or more computers, to cause the one or more computers to perform operations comprising:
remotely obtaining a present location of a wireless device;
determining, based on the present location and store location data, one or more physical retail locations of a business that are closest to the present location of the wireless device;
providing, to the wireless device, information identifying the one or more physical retail locations of the business that are closest to the present location of the wireless device;
after providing the information to the wireless device, iteratively remotely obtaining location data specifying locations of the wireless device over a time period following the information being provided to the wireless device;
determining, based on the location data, that the wireless device traveled to a particular physical retail location among the one or more physical retail locations during a first time period; and
determining, based on a second amount of time that the wireless device was located at the particular physical retail location, whether delivery of the information to the wireless device resulted in a specific user action, including:
determining that the delivery of the information to the wireless device resulted in the specific user action when the second amount of time that the wireless device was located at the particular physical retail location is greater than a specified threshold amount of time required to complete the specific user action after arriving at the particular physical retail location; and
determining that the delivery of the information to the wireless device failed to result in the specific user action when the second amount of time that the wireless device was located at the particular physical retail location is less than the specified threshold amount of time required to complete the specific user action after arriving at the particular physical retail location.

12. The system of claim 11, wherein providing information identifying the one or more physical retail locations of the business that are closest to the present location of the wireless device further comprises:
providing information related to one or more user action opportunities at the one or more physical retail locations of the business.

13. The system of claim 12, wherein the specified threshold amount of time is a minimum amount of time to complete the one or more user action opportunities at the one or more physical retail locations of the business.

14. The system of claim 13, further comprising:
determining that the delivery of the information to the wireless device resulted in the specific user action based on a comparison of temporal information for the particular physical retail location and the minimum amount of time to complete the specific user action associated with the particular physical retail location.

15. The system of claim 11, wherein determining one or more physical retail locations of a business that are closest to the present location of the wireless device further comprises:
determining, based on temporal profiles including hours of operation for the one or more physical retail locations of the business that are closest to the present location of the wireless device, the one or more physical retail locations that have temporal profiles that are presently open for business.

16. The system of claim 11, further comprising:
determining, based on the determination that the delivery of the information to the wireless device resulted in the specific user action, to provide additional information identifying a second set of one or more physical retail locations of the business that are closest to the present location of the wireless device.

17. The system of claim 11, wherein determining, based on the location data, that the wireless device traveled to the particular physical retail location among the one or more physical retail locations during the time period comprises:
determining, based on the location data, that the wireless device is located within a threshold distance of the particular physical retail locations for at least a threshold amount of time.

18. The system of claim 11, further comprising:
recording, for a plurality of wireless devices, data describing whether the provided information identifying the one or more physical retail locations of the business that are closest to present locations of the plurality of wireless resulted in the specific user action at the particular physical retail location; and
determining, based on the recorded data, associated conversion metrics for the provided information.

19. The system of claim 18, wherein the associated conversion metrics for the provided information are associated with a particular geographic region of the one or more physical retail locations of the business.

20. A non-transitory computer-readable storage device encoded with a computer program, the program comprising instructions that, if executed by one or more computers, cause the one or more computers to perform operations comprising:
remotely obtaining a present location of a wireless device;
determining, based on the present location and store location data, one or more physical retail locations of a business that are closest to the present location of the wireless device;
providing, to the wireless device, information identifying the one or more physical retail locations of the business that are closest to the present location of the wireless device;
after providing the information to the wireless device, iteratively remotely obtaining location data specifying locations of the wireless device over a time period following the information being provided to the wireless device;
determining, based on the location data, that the wireless device traveled to a particular physical retail location among the one or more physical retail locations during a first time period; and determining, based on a second amount of time that the wireless device was located at the particular physical retail location, whether delivery of the information to the wireless device resulted in a specific user action, including:

determining that the delivery of the information to the wireless device resulted in the specific user action when the second amount of time that the wireless device was located at the particular physical retail location is greater than a specified threshold amount of time required to complete the specific user action after arriving at the particular physical retail location; and     determining that the delivery of the information to the wireless device failed to result in the specific user action when the second amount of time that the wireless device was located at the particular physical retail location is less than the specified threshold amount of time required to complete the specific user action after arriving at the particular physical retail location.

21. The method of claim 1, wherein obtaining location data specifying locations of the wireless device over the time period following the information being provided to the wireless device comprises querying a present location of the wireless device.

22. The method of claim 1, wherein obtaining location data specifying locations of the wireless device over the time period following the information being provided to the wireless device comprises periodically polling location information from the wireless device.

23. The method of claim 1, wherein obtaining location data specifying locations of the wireless device over the time period following the information being provided to the wireless device comprises receiving location information from a device profile of the wireless device.

\* \* \* \* \*